United States Patent
Amano et al.

(10) Patent No.: US 7,682,692 B2
(45) Date of Patent: Mar. 23, 2010

(54) PRESSURE-SENSITIVE ADHESIVE PRODUCT

(75) Inventors: Tsuneyuki Amano, Ibaraki (JP); Takashi Imoto, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 511 days.

(21) Appl. No.: 11/329,046

(22) Filed: Jan. 11, 2006

(65) Prior Publication Data
US 2006/0154097 A1   Jul. 13, 2006

(30) Foreign Application Priority Data
Jan. 13, 2005   (JP) .................... P. 2005-005967

(51) Int. Cl.
*B32B 7/12* (2006.01)
(52) U.S. Cl. .................. 428/355 AC; 428/355 EN; 428/355 R
(58) Field of Classification Search ............ 428/355 R, 428/355 EN, 355 AC; 526/931
See application file for complete search history.

(56) References Cited

U.S. PATENT DOCUMENTS

| | | | | |
|---|---|---|---|---|
| 3,743,616 A | * | 7/1973 | Kest ............................ | 524/274 |
| 5,028,484 A | * | 7/1991 | Martin et al. ................ | 428/352 |
| 5,385,965 A | * | 1/1995 | Bernard et al. .............. | 524/272 |
| 5,965,255 A | * | 10/1999 | Ichimura et al. ............. | 428/353 |
| 6,107,219 A | * | 8/2000 | Joseph et al. ................ | 442/361 |
| 2002/0064670 A1 | | 5/2002 | Saito et al. | |
| 2006/0154097 A1 | | 7/2006 | Amano et al. | |

FOREIGN PATENT DOCUMENTS

| | | |
|---|---|---|
| EP | 0 968 711 A1 | 1/2000 |
| EP | 0993829 A1 | 4/2000 |
| EP | 1366762 A | 12/2003 |
| JP | 8-67857 A | 3/1996 |
| JP | 2000-338882 A | 12/2000 |
| JP | 2003-521719 A | 7/2003 |
| WO | WO 99/19857 A1 | 4/1999 |

OTHER PUBLICATIONS

European Search Report dated Oct. 19, 2006.
English translation of foreign Office Action dated May 30, 2008.
Office Communication issued in European Patent Application No. 06 000 422.3-2109, dated Jul. 31, 2009.

* cited by examiner

*Primary Examiner*—Thao T. Tran
(74) *Attorney, Agent, or Firm*—Sughrue Mion, PLLC

(57) ABSTRACT

A pressure-sensitive adhesive product contains a substrate having formed on at least one surface thereof a pressure-sensitive adhesive layer, wherein the substrate is formed from a styrene-based resin composition and the pressure-sensitive adhesive layer is formed from an acrylic pressure-sensitive adhesive containing an acrylic polymer, a liquid paraffin, and a rosin-based tackifying resin. In the acrylic pressure-sensitive adhesive, the ratio of the liquid paraffin is preferably 6 to 50 parts by weight based on 100 parts by weight of the acrylic polymer and the ratio of the rosin-based tackifying resin is preferably 1 to 30 parts by weight based on 100 parts by weight of the acrylic polymer. The liquid paraffin may have a number-average molecular weight of 300 to 500 and may have a dynamic viscosity at 37.8° C. of 6 to 80 mm$^2$/second.

9 Claims, No Drawings

PRESSURE-SENSITIVE ADHESIVE PRODUCT

FIELD OF THE INVENTION

The present invention relates to a pressure-sensitive adhesive product.

BACKGROUND OF THE INVENTION

Recently, various molded articles such as housings for electronic devices, e.g., housings for so-called "mobile phone" and housing for printers, have been recycled. There are cases that various pressure-sensitive adhesive labels, so-called nameplate labels, for indicating product information such as name of manufacturer, name of country of manufacture, name of product, product number, and product lot number are attached to electronics devices. When a pressure-sensitive adhesive label has been attached to an electronics device as above, in the case that the raw material of the housing of the electronic device is different from the raw material of the pressure-sensitive adhesive label, the raw material of the pressure-sensitive adhesive label may be incorporated into the raw material of the housing of the electronic device when the label is not peeled off at its recycle. Thus, physical properties of the recycled raw material may vary in some cases. For example, in the case that the raw material of the adherend (molded article) to be attached is a styrene-based resin, when the raw material of the substrate of the pressure-sensitive adhesive label is a polyester-based resin such as polyethylene terephthalate, a styrene-based resin is low in compatibility with a polyester-based resin, so that reproduction of the plastic (adherend derived from the styrene-based resin) with the pressure-sensitive adhesive label attached thereto results in insufficient strength of a molded article from the reproduced plastic and/or generation of defect(s) in appearance. Therefore, as the pressure-sensitive adhesive label, there has been developed a label using, as the raw material of the substrate, the same raw material or the same kind of raw material as the raw material of the adherend (molded article) to be attached or a raw material having a good compatibility therewith. For example, since a housing for electronic devices uses a styrene-based resin such as an acrylonitrile-butadiene-styrene-based copolymer, there has been proposed an pressure-sensitive adhesive label using a styrene-based resin such as polystyrene, an acrylonitrile-butadiene-styrene copolymer, or an acrylonitrile-styrene-acrylic rubber copolymer as the raw material for the substrate (see JP-A-8-67857, JP-A-2000-338882 (the term "JP-A" as used herein means an "unexamined published Japanese patent application") and JP-T-2003-521719 (the term "JP-T" as used herein means an "unexamined published International patent application")).

When a pressure-sensitive adhesive label was attached to the housing for an electronics device by mistake at the attachment of the label or when a trouble arises in the electronics device after the pressure-sensitive adhesive label is attached to the housing of the electronic device, in order to peel off the pressure-sensitive adhesive label to use the housing of the electronics device again, a pressure-sensitive adhesive label which is capable of easily being peeled off and does not leave any component of the pressure-sensitive adhesive on the surface of the adherend after peeling (without so-called "adhesive residue") has been desired. That is, a pressure-sensitive adhesive label having a good reworkability has been desired.

SUMMARY OF THE INVENTION

Accordingly, an object of the invention is to provide a pressure-sensitive adhesive product which is capable of substantially being recycled together with an adherend in the case that the adherend is formed from a styrene-based resin or a polycarbonate-based resin and is capable of easily being peeled off without leaving any component of the pressure-sensitive adhesive on the surface of the adherend at peeling.

Another object of the invention is to provide a pressure-sensitive adhesive product having a good repulsion resistance.

As a result of extensive studies for achieving the above objects, the present inventors have found that use of a substrate formed from a styrene-based resin composition and use of a pressure-sensitive adhesive having a specific composition as a pressure-sensitive adhesive forming a pressure-sensitive adhesive layer enable substantial recycle of the resulting pressure-sensitive adhesive product together with an adherend and also enable peeling thereof without leaving any component of the pressure-sensitive adhesive on the surface of the adherend at peeling. Moreover, they have found that repulsion resistance is also satisfactory and peeling from an edge part can be prevented for a long period of time even when the product is attached to a curved surface. The invention has been accomplished based on these findings.

Namely, the invention relates to a pressure-sensitive adhesive product comprising a substrate having formed on at least one surface thereof a pressure-sensitive adhesive layer, wherein the substrate is formed from a styrene-based resin composition and the pressure-sensitive adhesive layer is formed from an acrylic pressure-sensitive adhesive containing an acrylic polymer, a liquid paraffin, and a rosin-based tackifying resin.

In the acrylic adhesive for forming the pressure-sensitive adhesive layer according to the pressure-sensitive adhesive product of the invention, the ratio of the liquid paraffin is preferably 6 to 50 parts by weight based on 100 parts by weight of the acrylic polymer and the ratio of the rosin-based tackifying resin is preferably 1 to 30 parts by weight based on 100 parts by weight of the acrylic polymer.

The number-average molecular weight of the liquid paraffin is suitably 300 to 500. Moreover, the dynamic viscosity of the liquid paraffin at 37.8° C. is suitably 6 to 80 mm$^2$/second.

As the rosin-based tackifying resin, a polymerized rosin can be suitably used.

In the invention, the acrylic pressure-sensitive adhesive preferably further contains a crosslinking agent and as the crosslinking agent, an isocyanate-based crosslinking agent is suitably used.

As the above acrylic polymer, an acrylic polymer containing an alkyl acrylate having an alkyl group of 8 or more carbon atoms as a main monomer component can be suitably used.

As the above pressure-sensitive adhesive product, the thickness of the pressure-sensitive adhesive layer is preferably 5 to 50 μm and a 180° peeling adhesive force (tensile rate: 300 mm/minute, 23° C., 50% RH) is preferably 2 to 5 N/20 mm.

DETAILED DESCRIPTION OF THE INVENTION

The pressure-sensitive adhesive product of the invention has a constitution wherein a pressure-sensitive adhesive layer is formed on at least one surface of a substrate, the substrate being formed from a styrene-based resin composition and the pressure-sensitive adhesive layer being formed from an acrylic pressure-sensitive adhesive containing an acrylic polymer, a liquid paraffin, and a rosin-based tackifying resin. As above, since the substrate has been formed from a styrene-based resin composition, in the case that an adherend formed from a styrene-based resin or a polycarbonate-based resin is used, the product can be substantially recycled together with the adherend (so-called "material recycle"). In this connection, the sentence "the product can be substantially recycled together with the adherend" means that it is possible to produce a molded article the same as or different from the original adherend using a recycled raw material (material) in the case that the pressure-sensitive adhesive product is recycled together with the adherend (material recycle) in a state that the pressure-sensitive adhesive product of the invention is attached to the adherend, in particular, a molded article from a styrene-based resin or a polycarbonate-based resin. Therefore, the molded article produced using the recycled raw material may be a molded article having any physical properties, e.g., one wherein good physical properties inherent to the original adherend are effectively retained, one wherein good physical properties inherent to the original adherend are effectively retained and also other good physical properties are imparted, or one wherein other good physical properties are imparted instead of the good physical properties inherent to the original adherend.

In addition, since the pressure-sensitive adhesive layer is formed from an acrylic pressure-sensitive adhesive containing an acrylic polymer, a liquid paraffin, and a rosin-based tackifying resin, the pressure-sensitive adhesive layer formed from the acrylic pressure-sensitive adhesive can exhibit an excellent re-peeling ability and hence enables easy peeling of the pressure-sensitive adhesive product without leaving any component of the pressure-sensitive adhesive on the surface of the adherend. Therefore, a pressure-sensitive adhesive product having a good reworkability as a pressure-sensitive adhesive product can be produced.

Moreover, repulsion resistance can be also made satisfactory and thus the product can be attached even to an adherend having a curved surface or the like surface in a good state.

(Substrate)

In the pressure-sensitive adhesive product of the invention, the substrate is formed from a styrene-based resin composition. The styrene-based resin composition contains a styrene-based resin as a main component. Such a styrene-based resin is not particularly limited as far as it is a resin using styrene as a monomer component and there may be, for example, mentioned polystyrene, an acrylonitrile-styrene copolymer, an acrylonitrile-butadiene-styrene copolymer, an acrylonitrile-styrene-acrylic rubber copolymer, an acrylonitrile-chlorinated polyethylene-styrene copolymer, an acrylonitrile-(ethylene-propylene rubber)-styrene copolymer, an acrylonitrile-(ethylene-vinyl acetate copolymer)-styrene copolymer, a methyl methacrylate-butadiene-styrene copolymer, and the like. Moreover, the styrene-based resin may be, for example, a styrene-based resin in a form of a rubber or in a form of an elastomer, such as a styrene-butadiene copolymer, a styrene-isoprene copolymer, a styrene-isoprene-styrene block copolymer, a styrene-butadiene-styrene block copolymer, a styrene-ethylene-butylene-styrene block copolymer, a styrene-ethylene-propylene-styrene block copolymer, or a styrene-ethylene-propylene block copolymer. These styrene-based resins may be used solely or in combination of two or more thereof.

In the invention, as the styrene-based resin, a mixed resin of an acrylonitrile-styrene copolymer (sometimes referred to as "A-S copolymer") and an acrylonitrile-styrene-acrylic rubber copolymer (sometimes referred to as "A-S-A copolymer") can be suitably used. Namely, the substrate is preferably formed from a resin composition containing the A-S copolymer and the A-S-A copolymer as main components (sometimes referred to as "AS/ASA resin composition"). In the AS/ASA resin composition, the ratio of the A-S copolymer to the A-S-A copolymer is not particularly limited. For example, the ratio by weight of the A-S copolymer to the A-S-A copolymer is desirably 90/10 to 20/80, preferably 85/15 to 40/60, particularly 80/20 to 60/40. When the ratio of the A-S copolymer to the total weight of the A-S copolymer and the A-S-A copolymer is larger than 90% by weight (i.e., the ratio of the A-S-A copolymer is less than 10% by weight), tear resistance decreases due to a low tear strength of the substrate even when a pressure-sensitive adhesive having a good re-peeling ability is used. Therefore, the pressure-sensitive adhesive product is torn and cannot be easily peeled off and re-peeling ability decreases at the time when the pressure-sensitive adhesive product is attached to the adherend and then peeled off. On the other hand, when the ratio of the A-S copolymer to the total weight of the A-S copolymer and the A-S-A copolymer is less than 20% by weight (i.e., the ratio of the A-S-A copolymer is larger than 80% by weight), rigidity of the substrate decreases and the pressure-sensitive adhesive product may bend at the time when the pressure-sensitive adhesive product is attached to the adherend, so that the product cannot be easily attached and thus handling properties decrease.

The A-S-A copolymer is not particularly limited as far as it is a copolymer containing a unit of acrylonitrile (acrylonitrile unit), a unit of styrene (styrene unit), and a unit of acrylic rubber (acrylic rubber unit) and the copolymer can be suitably selected from among known A-S-A copolymers for use. In the A-S-A copolymer, the ratio of the acrylic rubber unit as a constitution unit is not particularly limited but is 30 to 70% by weight, preferably 40 to 60% by weight, more preferably 45 to 55% by weight relative to the A-S-A copolymer. When the ratio of the acrylic rubber unit is less than 30% by weight relative to the A-S-A copolymer, flexibility necessary as a film cannot be obtained. On the other hand, when the ratio is larger than 70% by weight, the copolymer is difficult to handle as an A-S-A copolymer owing to blocking and the like.

In the invention, as the A-S-A copolymer, an A-S-A copolymer containing the acrylic rubber unit and a unit of an acrylonitrile-styrene copolymer containing an acrylonitrile unit and a styrene unit as constitutional units (acrylonitrile-styrene copolymer unit) as constitutional units is suitable. In particularly, a graft A-S-A copolymer having a form wherein an acrylonitrile-styrene copolymer is grafted to an acrylic rubber can be suitably used. In the acrylonitrile-styrene copolymer unit in the graft A-S-A copolymer, the ratio of the acrylonitrile unit to the styrene unit is not particularly limited but, for example, the molar ratio of the acrylonitrile unit to the styrene unit is 30/70 to 45/55, preferably 35/65 to 40/60.

In this connection, the acrylonitrile-styrene copolymer unit in the graft A-S-A copolymer preferably has a form of a random copolymer but may have other forms such as a block copolymer wholly or partially.

The physical properties of the graft A-S-A copolymer can be controlled by the ratio of the acrylic rubber unit to the acrylonitrile-styrene copolymer unit (graft rate), particle size (average particle size) of the acrylic rubber unit, the weight-average molecular weight of the acrylic rubber unit, the weight-average molecular weight of the acrylonitrile-styrene copolymer, the ratio of the acrylonitrile unit to the styrene unit in the acrylonitrile-styrene copolymer unit, and the like.

Moreover, the A-S copolymer is not particularly limited as far as it is a copolymer containing an acrylonitrile unit and a styrene unit as constitutional units and can be suitably selected from among known A-S copolymers for use. The A-S copolymer preferably has a form of a random copolymer but may have other forms such as a block copolymer wholly or partially.

In the A-S copolymer, the ratio of the acrylonitrile unit to the styrene unit is not particularly limited but, for example, the molar ratio of the acrylonitrile unit to the styrene unit is 30/70 to 45/55, preferably 35/65 to 40/60.

The physical properties of the A-S copolymer can be controlled by the weight-average molecular weight, the ratio of the acrylonitrile unit to the styrene unit, and the like.

In the invention, the AS/ASA resin composition is not particularly limited as far as it is a resin composition containing the A-S copolymer and the A-S-A copolymer but is preferably has a form wherein the A-S-A copolymer is dispersed in the A-S copolymer. The AS/ASA resin composition having a form wherein the A-S-A copolymer, in particular, a graft A-S-A copolymer, is dispersed in the A-S copolymer can make various physical properties, particularly rigidity and tear resistance at its molding into a substrate for a pressure-sensitive adhesive product extremely good.

The process for producing the AS/ASA resin composition is not particularly limited and there may be, for example, mentioned (1) a process of mixing an A-S copolymer and an A-S-A copolymer prepared separately (so-called "blending process"), (2) a process for polymerizing acrylonitrile and styrene in the presence of an acrylic rubber under conditions that an A-S copolymer and an A-S-A copolymer are prepared (so-called "graft process"), (3) a process of mixing an A-S copolymer and an A-S-A copolymer prepared by polymerizing acrylonitrile and styrene in the presence of an acrylic rubber with an A-S copolymer or an A-S-A copolymer prepared separately (so-called "graft blending process or graft blending combined process"), and the like.

In the case that the A-S copolymer and the A-S-A copolymer are prepared separately, the A-S copolymer can be prepared by polymerization using acrylonitrile and styrene as monomer components with adopting known polymerization conditions. Moreover, the A-S-A copolymer can be prepared by polymerization using acrylonitrile and styrene as monomer components in the presence of an acrylic rubber with adopting known polymerization conditions. In this connection, at the preparation of the A-S-A copolymer, since there is a case that an acrylonitrile-styrene copolymer which is not bound to the acrylic rubber may form depending on the polymerization conditions, it is desirable to adopt such polymerization conditions that the production ratio of the acrylonitrile-styrene copolymer decreases as far as possible.

The thickness of the substrate is not particularly limited and can be suitably selected depending on the purpose and can be selected from the range of 20 to 200 μm, preferably 30 to 150 μm, more preferably 50 to 100 μm. In this connection, the substrate may have any form of a monolayer layer and a laminated layer.

The process for producing the substrate is not particularly limited and can be produced utilizing known processes for producing substrates. For example, the substrate can be produced by molding the above resin composition utilizing extrusion molding with a T-die, inflation molding, calendar molding, or the like.

The surface of the substrate may be subjected to a suitable known or conventional surface treatment, e.g., a physical treatment such as corona discharge treatment or plasma treatment or a chemical treatment such as undercoat treatment or backside treatment. Moreover, the substrate may be mixed with various additives such as a filler (inorganic filler, organic filler, etc.), an antiaging agent, an antioxidant, a UV absorber, a lubricant, a plasticizer, and a colorant (pigment, dye, etc.).

In the invention, as the substrate, an excellent heat resistance is desired in some cases depending on intended uses. In the intended uses where heat resistance is desired, a substrate having a shrinkage ratio (80° C.×1 hour) of 1% or less, preferably 0.5% or less, more preferably 0.2% or less can be suitably used as the substrate. In this connection, the shrinkage ratio of the substrate can be determined by measuring the size before and after heating, by means of a slide caliper.

(Pressure-sensitive Adhesive Layer)

As the pressure-sensitive adhesive constituting the pressure-sensitive adhesive layer, an acrylic pressure-sensitive adhesive containing an acrylic polymer, a liquid paraffin, and a rosin-based tackifying resin is used. In the acrylic pressure-sensitive adhesive, the acrylic polymer is used as a main component or a base polymer. The acrylic polymer is not particularly limited but, as a main constitutional monomer component (monomer main component), an alkyl (meth) acrylate (alkyl acrylate or alkyl methacrylate) is preferably used. Specifically, examples of the alkyl (meth)acrylate include methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, isoamyl (meth)acrylate, neopentyl (meth)acrylate, hexyl (meth)acrylate, heptyl (meth)acrylate, 2-ethylhexyl (meth)acrylate, octyl (meth) acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, and the like. The alkyl (meth)acrylate may be used solely or in combination of two or more thereof.

As such an alkyl (meth)acrylate, an alkyl (meth)acrylate having an alkyl group of 8 or more carbon atoms, particularly 2-ethylhexyl acrylate can be suitably used. Namely, as the acrylic polymer, an acrylic polymer containing an alkyl (meth)acrylate having an alkyl group of 8 or more carbon atoms, particularly 2-ethylhexyl acrylate as a monomer main component is suitable. By using the alkyl (meth)acrylate having an alkyl group of 8 or more carbon atoms as the alkyl (meth)acrylate, re-peeling ability and adhesive-residue resistance can be improved.

As the monomer components constituting the acrylic polymer, as far as an alkyl (meth)acrylate is used as a main component of the monomer, the other monomer component copolymerizable with the alkyl (meth)acrylate (sometimes referred to as "copolymerizable monomer component") may be used. In this connection, the ratio of the alkyl (meth) acrylate to the total amount of the monomer components constituting the acrylic polymer. is desirably 50% by weight or more. When the ratio of the alkyl (meth)acrylate is less than 50% by weight based on the total amount of the monomer components constituting the acrylic polymer, the properties as an acrylic polymer are hardly exhibited in some cases.

The copolymerizable monomer component can be used for introducing a crosslinking site into the acrylic polymer or enhancing an aggregating ability of the acrylic polymer. The copolymerizable monomer component may be used solely or in combination of two or more thereof.

Specifically, in order to introduce a crosslinking site into the acrylic polymer, a functional group-containing monomer component, especially a thermally crosslinkable functional group-containing monomer component for introducing a crosslinking site into the acrylic polymer, can be used as the copolymerizable monomer component. The use of the functional group-containing monomer component can enhance adhesive force toward the adherend. Such a functional group-containing monomer component is not particularly limited as far as it is a monomer component copolymerizable with the alkyl (meth)acrylate and having a functional group which becomes a crosslinking site. Examples thereof include carboxyl group-containing monomers such as (meth)acrylic acid, itaconic acid, crotonic acid, maleic acid, fumaric acid, and isocrotonic acid or acid anhydrides thereof such as maleic anhydride and itaconic anhydride; hydroxyl group-containing monomers, e.g., hydroxyalkyl (meth)acrylates such as 2-hydroxyethyl (meth)acrylate, 2-hydroxypropyl (meth) acrylate, and 2-hydroxybutyl (meth)acrylate and also vinyl alcohol and allyl alcohol; amide-based monomers such as (meth)acrylamide, N,N-dimethyl(meth)acrylamide, N-butyl (meth)acrylamide, N-methylol(meth)acrylamide, N-methylolpropane(meth)-acrylamide, N-methoxymethyl(meth) acrylamide, and N-butoxymethyl(meth)acrylamide; amino group-containing monomers such as aminoethyl (meth)acrylate, N,N-dimethylaminoethyl (meth) acrylate, and t-butylaminoethyl (meth)acrylate; epoxy group-containing monomers such as glycidyl (meth)acrylate and methylglycidyl (meth)acrylate; cyano-containing monomers such as acrylonitrile and methacrylonitrile; monomers having a nitrogen atom-containing ring, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, and N-(meth)acryloylmorpholine; and the like. As the functional group-containing monomer component, a carboxyl group-containing monomer such as acrylic acid or an acid anhydride thereof can be suitably used.

Moreover, as the copolymerizable monomer component, the other copolymerizable monomer component can be used in order to enhance the aggregating ability of the acrylic polymer. Examples of the other copolymerizable monomer component include vinyl ester-based monomers such as vinyl acetate and vinyl propionate; styrene-based monomers such as styrene, substituted styrene (α-methylstyrene, etc.), and vinyltoluene; non-aromatic ring-containing (meth)acrylate esters such as cycloalkyl (meth)acrylates [cyclohexyl (meth) acrylate, cyclopentyl di(meth)acrylate, etc.] and bornyl (meth)acrylate and isobornyl (meth)acrylate; aromatic ring-containing (meth)acrylate esters such as aryl (meth)acrylate [phenyl (meth)acrylate, etc.], aryloxyalkyl (meth) acrylate [phenoxyethyl (meth) acrylate, etc.], and arylalkyl (meth) acrylates [benzyl (meth)acrylate]; olefinic monomers such as ethylene, propylene, isoprene, butadiene, and isobutylene; vinyl chloride and vinylidene chloride; isocyanate group-containing monomers such as 2-(meth)acryloyloxyethyl isocyanate; alkoxy group-containing monomers such as methoxyethyl (meth)acrylate and ethoxyethyl (meth)acrylate; vinyl ether-based monomers such as methyl vinyl ether and ethyl vinyl ether; and also polyfunctional monomers such as 1,6-hexanediol di(meth)acrylate, ethylene glycol di(meth) acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, polypropylene glycol di(meth)acrylate, neopentyl glycol di(meth)acrylate, pentaerythritol di(meth) acrylate, trimethylolpropane tri(meth)acrylate, pentaerythritol tri(meth)acrylate, dipentaerythritol hexa(meth)acrylate, glycerin di(meth)acrylate, epoxy acrylates, polyester acrylates, urethane acrylates, divinylbenzene, butyl di(meth)acrylate, and hexyl di(meth)acrylate; and the like.

As the process for polymerizing the acrylic polymer, known or conventional polymerization processes, e.g., an emulsion polymerization process, a solution polymerization process, a suspension polymerization process, and the like, can be adopted. At the polymerization, various polymerization processes such as a general all-components-charging process (at once polymerization process), a monomer-dropping process (continuously dropping process, portion-wise dropping process, etc.) can be adopted. The polymerization temperature can be suitably selected according to the kind of the monomer, the kind of an initiator, and the like and can be, for example, selected from the range of 20 to 100° C.

The polymerization initiator to be used at the polymerization can be suitably selected from known or conventional polymerization initiators (azo polymerization initiators, persulfate salt-based polymerization initiators, peroxide-based polymerization initiators, redox system polymerization initiators, etc.) according to the kind of the polymerization process. Moreover, at the polymerization, a chain transfer agent can be used for regulating the molecular weight. As the chain transfer agent, known or conventional chain transfer agents can be used.

As the rosin-based tackifying resin contained in the acrylic pressure-sensitive adhesive, there may be, for example, mentioned unmodified rosins (raw rosins) such as gum rosin, wood rosin, and tall oil resin and modified rosins modified by hydrogenation, disproportionation, polymerization, or the like, such as hydrogenated rosins, disproportionated rosins, polymerized rosins, and other chemically modified rosins as well as various rosin derivatives and the like. Examples of the above rosin derivatives include rosin esters such as ester compounds of rosins obtainable by esterifying unmodified rosins with alcohols and ester compounds of modified rosins obtainable by esterifying modified rosins such as hydrogenated rosins, disproportionated rosins, or polymerized rosins with alcohols; unsaturated fatty acid-modified rosins obtainable by modifying unmodified rosins or modified rosins such as hydrogenated rosins, disproportionated rosins, or polymerized rosins with unsaturated fatty acids; unsaturated fatty acid-modified rosin esters obtainable by modifying rosin esters with unsaturated fatty acids; rosin alcohols obtainable by reducing the carboxyl group in unmodified rosins, modified rosins such as hydrogenated rosins, disproportionated rosins, or polymerized rosins, unsaturated fatty acid-modified rosins, or unsaturated fatty acid-modified rosin esters; metal salts of rosins such as unmodified rosins, modified rosins, or various rosin derivatives, particularly rosin esters. Moreover, as the rosin derivatives, rosin phenol resins obtainable by incorporating phenol into rosins such as unmodified rosins, modified rosins, or various rosin derivatives by the action of an acid catalyst, followed by thermal polymerization.

As the rosin-based tackifying resin, a rosin resin (unmodified rosin); a rosin-based resin subjected to modification such as polymerization, disproportionation, or hydrogenation (modified rosin); a rosin ester such as an ester compound of a rosin and an ester compound of a modified rosin, particularly a polymerized rosin, can be suitably used. As above, by using a polymerized rosin as the rosin-based tackifying resin, re-peeling ability and adhesive-residue resistance can be improved.

In this connection, as the rosin-based tackifying resin, in order to exhibit a high adhesiveness toward the pressure-sensitive adhesive product, a rosin-based tackifying resin having a softening point (softening temperature) of 120° C. or higher, preferably 130° C. or higher, more preferably 140° C.

or higher is suitable, the softening point being measured by the ring and ball method defined by JIS K 5902. The upper limit of the softening point of the rosin-based tackifying resin is not particularly limited and may be, for example, 170° C. or lower, preferably 160° C. or lower, more preferably 155° C. or lower.

The ratio of the rosin-based tackifying resin is not particularly limited but, for example, is 1 to 30 parts by weight, preferably 2 to 20 parts by weight, more preferably 5 to 15 parts by weight based on 100 parts by weight of the acrylic polymer. When the ratio of the rosin-based tackifying resin is less than 1 part by weight based on 100 parts by weight of the acrylic polymer, pressure-sensitive adhesive force and repulsion resistance decrease. On the other hand, when the ratio exceeds 30 parts by weight, re-peeling ability decreases.

Furthermore, the liquid paraffin contained in the acrylic pressure-sensitive adhesive means a paraffin liquid at ambient temperature (20 to 25° C.). The liquid paraffin is mainly composed of alkylnaphthenes and is fundamentally a hydrocarbon oil. The liquid paraffin may be used solely or in combination of two or more thereof. The liquid paraffin may be a liquid paraffin for any intended use, such as an industrial liquid paraffin or a pharmaceutical liquid paraffin.

Specifically, it is suitable for the liquid paraffin to have a number-average molecular weight of 300 to 500, preferably 320 to 450, more preferably 350 to 400. When the number-average molecular weight of the liquid paraffin is small, e.g., less than 300, there is a possibility that contamination of the adherend with the liquid paraffin may occur or it may vaporize during drying at the production of a pressure-sensitive adhesive product to cause decrease in performance of the pressure-sensitive adhesive product or contamination of facilities and furthermore, pressure-sensitive adhesive force and repulsion resistance may decrease. On the other hand, when the number-average molecular weight of the liquid paraffin is large, e.g., larger than 500, there is a possibility of occurrence of contamination of the adherend with the liquid paraffin at re-peeling, separation during the production owing to insufficient compatibility with the acryl polymer, bleeding onto the surface of the pressure-sensitive adhesive, uneven performance, and the like. In this connection, the number-average molecular weight of the liquid paraffin can be determined under known or conventional measuring conditions utilizing a known or conventional method for measuring molecular weight.

Moreover, the liquid paraffin preferably has a dynamic viscosity at 37.8° C. of 6 to 80 mm$^2$/second, preferably 10 to 50 mm$^2$/second, more preferably 20 to 30 mm$^2$/second. In this connection, the dynamic viscosity of the. liquid paraffin can be determined by dividing the viscosity measured using a capillary dynamic viscosimeter or a common viscosimeter by specific gravity.

The ratio of the liquid paraffin is not particularly limited but, for example, is 6 to 50 parts by weight, preferably 10 to 40 parts by weight, more preferably 15 to 35 parts by weight based on 100 parts by weight of the acrylic polymer. When the ratio of the liquid paraffin is less than 6 parts by weight based on 100 parts by weight of the acrylic polymer, re-peeling ability decreases. On the other hand, when the ratio exceeds 50 parts by weight, there is a possibility of occurrence of contamination of the adherend with the liquid paraffin at re-peeling, separation during the production owing to insufficient compatibility with the acryl polymer, bleeding onto the surface of the pressure-sensitive adhesive, uneven performance, and the like and also pressure-sensitive force and repulsion resistance may decrease.

Furthermore, in the invention, a crosslinking agent may be contained in the acrylic pressure-sensitive adhesive, if necessary. The crosslinking agent is not particularly limited and can be suitably selected from among known or conventional crosslinking agents, e.g., isocyanate-based crosslinking agents, epoxy-based crosslinking agents, oxazolidine-based crosslinking agents, aziridine-based crosslinking agents, melamine-based crosslinking agents, peroxide-based crosslinking agents, urea-based crosslinking agents, metal alkoxide-based crosslinking agents, metal chelete-based crosslinking agents, metal salt-based crosslinking agents, carbodiimide-based crosslinking agents, amine-based crosslinking agents, and the like. The crosslinking agents can be used solely or in combination of two or more thereof.

As the crosslinking agent, an isocyanate-based crosslinking agent can be suitably used. The isocyanate-based crosslinking agent is not particularly limited and includes aliphatic polyisocyanates, alicyclic polyisocyanates, aromatic polyisocyanates, aromatic aliphatic polyisocyanates, as well as dimers and trimers thereof and reaction products or polymers thereof. Specifically, examples of the isocyanate-based crosslinking agent include tolylene diisocyanate, hexamethylene diisocyanate, polymethylene polyphenylisocyanate, diphenylmethane diisocyanate, dimer of diphenylmethane diisocyanate, reaction products of trimethylolpropane and tolylene diisocyanate, reaction products of trimethylolpropnae and hexamethylene diisocyanate, polyether polyisocyanates, polyester polyisocyanates, and the like. The amount of the isocyanate-based compound to be used is, for example, about 0.01 to 20 parts by weight, preferably 0.05 to 15 parts by weight based on 100 parts by weight of the acrylic polymer.

Moreover, the acrylic pressure-sensitive adhesive may contains suitable additives such as a tackifying agent other than the rosin-based tackifying agent, a softening agent other than a liquid paraffin, a plasticizer, a filler, an antiaging agent, a UV absorber, an antioxidant, a colorant (pigment, dye, etc.), a surfactant, an antistatic agent, a foam inhibitor, and a peeling regulator, in addition to the polymer component such as a pressure-sensitive adhesive component (base polymer), the rosin-based tackifying agent, the liquid paraffin, and the crosslinking agent.

Moreover, the acrylic pressure-sensitive adhesive may be any form of pressure-sensitive adhesives, such as a solvent-type pressure-sensitive adhesive, an emulsion-type pressure-sensitive adhesive, an oligomer-type pressure-sensitive adhesive, a solid-type pressure-sensitive adhesive, and the like. In this connection, in the case that the acrylic pressure-sensitive adhesive is a solvent-type pressure-sensitive adhesive, the solvent to be used can be suitably selected from known solvents. In the case that the acrylic pressure-sensitive adhesive is an emulsion-type pressure-sensitive adhesive, an emulsifier can be used, if necessary, and the emulsifier can be selected from known emulsifiers and used.

The pressure-sensitive adhesive layer can be formed by applying, on a predetermined surface of the substrate, the above acrylic pressure-sensitive adhesive, followed by drying or curing. At the application of the acrylic pressure-sensitive adhesive, a conventional coater, e.g., a gravure roll coater, a reverse roll coater, a kiss roll coater, a dip roll coater, a bar coater, a knife coater, a spray coater, or the like, can be employed.

The thickness of the pressure-sensitive adhesive layer can be suitably selected from the range of 5 to 50 μm, preferably 10 to 30 μm, for example. When the thickness of the pressure-sensitive adhesive layer is too thin, pressure-sensitive adhesive force and repulsion resistance decrease. On the other hand, when the thickness is too thick, the amount of run-over of the pressure-sensitive adhesive component (adhesive) becomes large.

(Pressure-sensitive Adhesive Product)

The pressure-sensitive adhesive product of the invention is not particularly limited as far as it has a constitution wherein a pressure-sensitive adhesive layer is formed on at least one surface (both sides or one side) of a substrate but is preferably a sheet-shape pressure-sensitive adhesive product having or capable of having a form of a sheet-shape article having a pressure-sensitive adhesive layer. Specifically, examples of the pressure-sensitive adhesive product include a pressure-sensitive adhesive sheet (pressure-sensitive adhesive sheet with a substrate), a pressure-sensitive adhesive tape (pressure-sensitive adhesive tape with a substrate), a pressure-sensitive adhesive film, a pressure-sensitive adhesive label, or the like.

In the invention, as the pressure-sensitive adhesive product, the pressure-sensitive adhesive label is suitable. The pressure-sensitive adhesive label usually has a form wherein a pressure-sensitive adhesive layer is formed on at least one surface of the substrate and a display part, e.g., a display part formed utilizing an image-forming means such as printing, is formed on either side or both sides of the substrate but may have the other form. Specifically, as the pressure-sensitive adhesive label, there may be, for example, mentioned a pressure-sensitive adhesive label having a display part on which product information of the adherend to be attached, e.g., name of manufacturer, name of country of manufacture, name of product, product number, product lot number, and bar code, is indicated (nameplate label), a pressure-sensitive adhesive label having a display part indicating a sales price and the like of the adherend, a pressure-sensitive adhesive label having a display part indicating a cautionary statement, usage, and the like of the adherend, a pressure-sensitive adhesive label having a display part indicating logotypes such as a logotype of manufacturer and a logotypes of product as well as a pressure-sensitive adhesive label having a display part indicating a combination of these matters for indication, and the like.

In this connection, in the pressure-sensitive adhesive label, the display part can be formed by utilizing a known display part-forming means such as printing means, e.g., seal printing such as relief printing or screen printing or thermal transfer printing. Moreover, the display part may be formed on the substrate beforehand and may be formed after the pressure-sensitive adhesive layer is formed on a predetermined surface of the substrate.

The pressure-sensitive adhesive product of the invention may have other layers, e.g., an intermediate layer, an under coat layer, etc., within the range where the advantages of the invention are not impaired. Moreover, the pressure-sensitive adhesive layer may be protected by a release liner.

The 180° peeling adhesive force (tensile rate: 300 mm/minute, 23° C., 50% RH) of the pressure-sensitive adhesive product is suitably 2 to 5 N/20 mm, preferably 2.5 to 4 N/20 mm. When the 180° peeling adhesive force (tensile rate: 300 mm/minute, 23° C., 50% RH) is less than 2 N/20 mm, pressure-sensitive adhesive force is too small and the product is apt to peel off. On the other hand, when the force is larger than 5 N/20 mm, re-peeling ability decreases. The pressure-sensitive adhesive force (180° peeling adhesive force) of the pressure-sensitive adhesive product is determined by measuring a force required for peeling by a tensile tester under conditions of a peeling angle of 180° and a tensile rate of 300 mm in an atmosphere of 23° C. and 50% RH after the pressure-sensitive adhesive product is attached by pressure on a stainless steel plate (SUS plate) burnished with an abrasive paper of No. 280 grain size or an acrylonitrile-butadiene-styrene-based resin plate (ABS resin plate) by the method of reciprocating a rubber roller having a weight of 2 kgf once and is allowed to stand under an environment of 23° C. and 50% RH for 3 days.

The pressure-sensitive adhesive product can be produced in accordance with a known process for producing a pressure-sensitive adhesive product, e.g., a known process for producing a pressure-sensitive adhesive tape and a pressure-sensitive adhesive sheet, a known process for producing a pressure-sensitive adhesive film, or a known process for producing a pressure-sensitive adhesive label depending on the kind of the pressure-sensitive adhesive product. Specifically, in the case that the pressure-sensitive adhesive product is a pressure-sensitive adhesive sheet or a pressure-sensitive adhesive film, as a process for producing the pressure-sensitive adhesive sheet or the pressure-sensitive adhesive film, there may be mentioned (1) a preparation method comprising applying a pressure-sensitive adhesive on at least one surface (one side or both sides) of a substrate so that the thickness after drying becomes a predetermined thickness and subsequently drying the pressure-sensitive adhesive to form a pressure-sensitive adhesive layer, (2) a preparation method comprising applying, on a separator, a pressure-sensitive adhesive so that the thickness after drying becomes a predetermined thickness and drying the pressure-sensitive adhesive to form a pressure-sensitive adhesive layer, and then transferring the pressure-sensitive adhesive layer onto at least one surface (one side or both sides) of a substrate; or the like method.

Moreover, in the case that the pressure-sensitive adhesive product is a pressure-sensitive adhesive label, as a process for producing the pressure-sensitive adhesive label, there may be mentioned (1) a preparation method comprising applying a pressure-sensitive adhesive on at least one surface (one side or both sides) of a substrate wherein a display part has been formed on a predetermined surface by printing or the like beforehand so that the thickness after drying becomes a predetermined thickness and subsequently drying the pressure-sensitive adhesive to form a pressure-sensitive adhesive layer; (2) a preparation method comprising applying a pressure-sensitive adhesive on one surface (one side) of a substrate so that the thickness after drying becomes a predetermined thickness and drying the pressure-sensitive adhesive to form a pressure-sensitive adhesive layer and then forming a display part on another surface of the substrate by printing or the like; (3) a preparation method comprising applying, on a separator, a pressure-sensitive adhesive so that the thickness after drying becomes a predetermined thickness and drying the pressure-sensitive adhesive to form a pressure-sensitive adhesive layer, and then transferring the pressure-sensitive adhesive layer onto at least one surface (one side or both sides) of a substrate wherein a display part has been formed on a predetermined surface by printing or the like beforehand; (4) a preparation method comprising applying, on a separator, a pressure-sensitive adhesive so that the thickness after drying becomes a predetermined thickness and drying the pressure-sensitive adhesive to form a pressure-sensitive adhesive layer, then transferring the pressure-sensitive adhesive layer onto one surface (one side) of a substrate, and further forming a display part on another surface of the substrate by printing or the like; or the like method.

In this connection, in the process for producing the above pressure-sensitive adhesive product, it is important to use a substrate formed from a styrene-based resin composition as the substrate. In particular, when a styrene-based resin composition containing the A-S copolymer and the A-S-A copolymer in a weight ratio of the A-S copolymer to the A-S-A copolymer of 90/10 to 20/80 is used as a styrene-based resin composition for the substrate, a balance of various physical properties of the substrate is satisfactory and in particular, physical properties such as heat resistance, weather resistance, rigidity, and tear resistance are excellent. Therefore, for example, since the substrate has an excellent rigidity, the pressure-sensitive adhesive product neither bends or droops and it maintains a tense state at the time when the pressure-sensitive adhesive product is attached to the adherend, so that the attachment can be easily performed. Moreover, since the substrate has an excellent tear resistance, the pressure-sensitive adhesive product can be easily peeled off with little or no tearing thereof in the case that the product is peeled off from its edge part when attached to the adherend by mistake or when the adherend should be repaired after the product has been attached to the adherend. Furthermore, since the substrate has a good heat resistance, the product can be attached to the adherend, which may be heated to a high temperature. Also, since the substrate has a good weather resistance, the product can be attached to the adherend, which may be exposed to natural light.

Moreover, as the pressure-sensitive adhesive constituting the pressure-sensitive adhesive layer, it is important to use an acrylic pressure-sensitive adhesive containing an acrylic polymer, a liquid paraffin, and a rosin-based tackifying resin.

In the invention, in the case that the pressure-sensitive adhesive product has a long strip-shaped form, it may have a roll-shaped wound form. On this occasion, the pressure-sensitive adhesive layer may be protected by a lease liner or a release surface (release treatment layer surface) formed on the backside of the substrate.

Since the substrate is formed from the styrene-based resin composition, it is possible to substantially recycle the pressure-sensitive adhesive product of the invention together with the adherend in the case that the product is attached to the adherend which is formed from a styrene-based resin or a polycarbonate-based resin as a raw material.

As the adherend, various molded articles using a styrene-based resin, a polycarbonate-based resin, or a resin composition wherein these resins are mixed (mixed resin composition) as a raw material are suitable. The styrene-based resin is not particularly limited as far as it is a resin wherein styrene is used as a monomer component. Specifically, examples of the styrene-based resin include polystyrene, an acrylonitrile-styrene-based resin (so-called "AS resin"), an acrylonitrile-butadiene-styrene-based resin (so-called "ABS resin"), an acrylonitrile-styrene-acrylic rubber resin (so-called "ASA resin"), an acrylonitrile-chlorinated polyethylene-styrene-based resin (so-called "ACS resin"), an acrylonitrile-(ethylene-propylene rubber)-styrene-based resin (so-called "AES resin"), an acrylonitrile-(ethylene-vinyl acetate copolymer)-styrene-based resin, a methyl methacrylate-butadiene-styrene-based resin (so-called "MBS resin"), and the like. Moreover, the styrene-based resin may be, for example, a styrene-based resin in a rubber form or an elastomer form, such as a styrene-butadiene copolymer (SB), a styrene-isoprene copolymer (SI), a styrene-isoprene-styrene block copolymer (SIS), a styrene-butadiene-styrene block copolymer (SBS), a styrene-ethylene-butylene-styrene block copolymer (SEBS), a styrene-ethylene-propylene-styrene block copolymer (SEPS), or a styrene-ethylene-propylene block copolymer (SEP).

The polycarbonate-based resin is not particularly limited as far as it is a resin having a carbonate ester bond [—O—C(=O)—O—] in a main chain. Specifically, as the polycarbonate-based resin, there may be, for example, mentioned polycarbonate-based resins using bisphenol A and carbonyl chloride or diphenyl carbonate as monomer components.

Examples of such molded articles include housings for electronics devices, e.g., housings for so-called "mobile phone", housings for so-called "PHS", housings for so-called "digital camera", housings for so-called "digital video camera", housings for computers, housings for printers, housings for key board or mouse for computers, housings for scanners, housings for drive devices for so-called "hard disk", housings for drive devices for floppy disks, housings for drive devices for so-called "CD" (housings for drive devices in which a disk such as so-called "CD-ROM", "CD-R", or "CD-RW" is usable), housings for drive devices for so-called "DVD" (housings for drive devices in which a disk such as so-called "DVD", "DVD-R", "DVD-RW", "DVD+R", "DVD+RW", or "DVD-RAM" is usable), housings for drive devices for so-called "MO", and housings for other computer-related devices; housings for home appliances, e.g., housings for refrigerators, housings for clothes washing machines, housings for cleaners, housings for so-called "air conditioner", housings for so-called "television" (so-called "Braun tube"-type television, so-called "liquid crystal display"-type television, so-called "plasma display"-type television, etc.), housings for radios, housings for music replay devices (housings for so-called "CD component", housings for so-called "radio-cassette recorder", etc.), housings for picture recording and reproducing devices (housings for picture recording and reproducing devices for television programs in which a video tape, so-called "DVD", or hard disk is usable), housings for so-called "projector"; and housings for various products such as various toys.

The pressure-sensitive adhesive product of the invention can be substantially recycled together with an adherend when the adherend is formed from a styrene-based resin or a polycarbonate-based resin and also can be easily peeled off without leaving any component of the pressure-sensitive adhesive on the surface of the adherend at peeling. Moreover, repulsion resistance is also satisfactory. Therefore, in the case that the pressure-sensitive adhesive product of the invention is attached to housings of various electronics devices using a styrene-based resin or a polycarbonate-based resin as a raw material, the pressure-sensitive adhesive product can be substantially recycled together with the housings without peeling the product in a state of being attached to the housings and hence workability at the recycling can be remarkably improved. Moreover, when the pressure-sensitive adhesive product of the invention is peeled off in the case that it is attached to an adherend by mistake or the adherend is to be repaired, the product can be easily peeled off without leaving any component of the pressure-sensitive adhesive on the surface of the adherend and thus excellent reworkability can be exhibited. Furthermore, the product can be satisfactorily attached to an adherend having a curved surface or the like surface.

The following will describe the invention more specifically with reference to Examples thereof.

EXAMPLE 1

An acrylic polymer (sometimes referred to as "Acrylic Polymer A") having a weight-average molecular weight of 600,000 was obtained by charging 97 parts by weight of 2-ethylhexyl acrylate, 3 parts by weight of acrylic acid, 0.2 part by weight of 2,2'-azobisisobutyronitrile as a polymerization initiator, and 100 parts by weight of ethyl acetate as a polymerization medium into a reaction vessel fitted with a thermometer, a stirrer, a nitrogen-inlet tube, and the like and carrying out the reaction at 60° C. under a nitrogen gas stream.

Moreover, an acrylic pressure-sensitive adhesive (sometimes referred to as "Acrylic Pressure-Sensitive Adhesive A") was obtained by adding 25 parts by weight of a liquid paraffin (trade name "Hycol K-250" manufactured by Kaneda K. K.; number-average molecular weight: 380, dynamic viscosity at 37.8° C.: about 18 mm$^2$/second), 10 parts by weight of a rosin-based tackifying resin (trade name "Pensel D-135" manufactured by Arakawa Chemical Industries, Ltd.; a polymerized rosin), and 3 parts by weight of a crosslinking agent (trade name "Coronate L" manufactured by Nippon Polyurethane Industry Co., Ltd.; an isocyanate-based crosslinking agent) to 100 parts by weight of the above Acrylic Polymer A.

On the other hand, a substrate for a pressure-sensitive adhesive product having a thickness of 100 μm (sometimes referred to as "Substrate A for Pressure-Sensitive Adhesive Product") was obtained by subjecting an ABS resin (acrylonitrile-butadiene-styrene-based resin; trade name "Techno ABS620" manufactured by Technopolymer Co., Ltd.) as a styrene-based resin to rolling by a calendar process (temperature of calendar roll: 180° C.).

The above Acrylic Pressure-Sensitive Adhesive A was applied on the release treatment surface of a separator (separator having a constitution wherein one surface of a polyethylene terephthalate film is subjected to release treatment with a silicone-based releasing agent) so that the thickness after drying was 30 μm and dried and cured to form a pressure-sensitive adhesive layer (thickness: 30 μm). The pressure-sensitive adhesive layer was attached to the above Substrate A for Pressure-Sensitive Adhesive Product by means of a hand roller to obtain a pressure-sensitive adhesive sheet as a pressure-sensitive adhesive product.

EXAMPLE 2

An acrylic pressure-sensitive adhesive (sometimes referred to as "Acrylic Pressure-Sensitive Adhesive B") was obtained in the same manner as in Example 1 except that the amount of a liquid paraffin (trade name "Hycol K-250" manufactured by Kaneda K. K.; number-average molecular weight: 380, dynamic viscosity at 37.8° C.: about 18 mm$^2$/second) was changed to 30 parts by weight.

A pressure-sensitive adhesive sheet as a pressure-sensitive adhesive product was obtained in the same manner as in Example 1 except that Acrylic Pressure-Sensitive Adhesive B was used.

EXAMPLE 3

An acrylic pressure-sensitive adhesive (sometimes referred to as "Acrylic Pressure-Sensitive Adhesive C") was obtained in the same manner as in Example 1 except that 5 parts by weight of "Pensel D-125"(a trade name, manufactured by Arakawa Chemical Industries, Ltd.; a polymerized rosin) was used as a rosin-based tackifying resin.

A pressure-sensitive adhesive sheet as a pressure-sensitive adhesive product was obtained in the same manner as in Example 1 except that Acrylic Pressure-Sensitive Adhesive C was used.

EXAMPLE 4

A substrate for a pressure-sensitive adhesive product having a thickness of 80 μm (sometimes referred to as "Substrate B for Pressure-Sensitive Adhesive Product") was obtained by kneading 70 parts by weight of an acrylonitrile-styrene copolymer [acrylonitrile-styrene copolymer wherein the molar ratio of an acrylonitrile unit to a styrene unit as constitutional units was 38/62] and 30 parts by weight of an acrylonitrile-styrene-acrylic rubber copolymer [acrylonitrile-styrene-acrylic rubber copolymer wherein the molar ratio of an acrylonitrile unit to a styrene unit as constitutional units was 38/62 and the ratio of an acrylic rubber unit as a constitutional unit to the acrylonitrile-styrene-acrylic rubber copolymer was 50% by weight], and 10 parts by weight of titanium oxide and subjecting the resulting kneaded product to rolling by a calendar process (temperature of calendar roll: 180° C.).

A pressure-sensitive adhesive sheet as a pressure-sensitive adhesive product was obtained in the same manner as in Example 1 except that Substrate B for Pressure-Sensitive Adhesive Product was used.

COMPARATIVE EXAMPLE 1

Acrylic Polymer A was prepared in the same manner as in Example 1. An acrylic pressure-sensitive adhesive (sometimes referred to as "Acrylic Pressure-Sensitive Adhesive D") was obtained by adding 10 parts by weight of a rosin-based tackifying resin (trade name "Pensel D-135" manufactured by Arakawa Chemical Industries, Ltd.; a polymerized rosin) and 3 parts by weight of a crosslinking agent (trade name "Coronate L" manufactured by Nippon Polyurethane Industry Co., Ltd.; an isocyanate-based crosslinking agent) to 100 parts by weight of Acrylic Polymer A. Thus, Acrylic Pressure-Sensitive Adhesive D corresponds to a pressure-sensitive adhesive wherein the liquid paraffin is eliminated from Acrylic Pressure-Sensitive Adhesive A.

A pressure-sensitive adhesive sheet as a pressure-sensitive adhesive product was obtained in the same manner as in Example 1 except that Acrylic Pressure-Sensitive Adhesive D was used.

COMPARATIVE EXAMPLE 2

Acrylic Polymer A was prepared in the same manner as in Example 1. An acrylic pressure-sensitive adhesive (sometimes referred to as "Acrylic Pressure-Sensitive Adhesive E") was obtained by adding 25 parts by weight of a liquid paraffin (trade name "Hycol K-250" manufactured by Kaneda K. K.; number-average molecular weight: 380, dynamic viscosity at 37.8° C.: about 18 mm$^2$/second) and 3 parts by weight of a crosslinking agent (trade name "Coronate L" manufactured by Nippon Polyurethane Industry Co., Ltd.; an isocyanate-based crosslinking agent) to 100 parts by weight of Acrylic Polymer A. Thus, Acrylic Pressure-Sensitive Adhesive E corresponds to a pressure-sensitive adhesive wherein the rosin-based tackifying resin is eliminated from Acrylic Pressure-Sensitive Adhesive A.

A pressure-sensitive adhesive sheet as a pressure-sensitive adhesive product was obtained in the same manner as in Example 1 except that the Acrylic Pressure-Sensitive Adhesive E was used.

COMPARATIVE EXAMPLE 3

Acrylic Polymer A was prepared in the same manner as in Example 1. An acrylic pressure-sensitive adhesive (sometimes referred to as "Acrylic Pressure-Sensitive Adhesive F") was obtained by adding 25 parts by weight of a liquid paraffin (trade name "Hycol K-250" manufactured by Kaneda K. K.; number-average molecular weight: 380, dynamic viscosity at 37.8° C.: about 18 mm$^2$/second), 10 parts by weight of a phenol-based tackifying resin (trade name "Simulate Resin PR-12603N" manufactured by Sumitomo Bakelite Co., Ltd.), and 3 parts by weight of a crosslinking agent (trade name "Coronate L" manufactured by Nippon Polyurethane Industry Co., Ltd.; an isocyanate-based crosslinking agent) to 100 parts by weight of Acrylic Polymer A.

A pressure-sensitive adhesive sheet as a pressure-sensitive adhesive product was obtained in the same manner as in Example 1 except that the Acrylic Pressure-Sensitive Adhesive F was used.

(Evaluation)

On each of the pressure-sensitive adhesive sheets obtained in Examples 1 to 4 and Comparative Examples 1 to 3, pressure-sensitive adhesive force, re-peeling ability, adhesive-residue resistance, and repulsion resistance were evaluated or measured by the following evaluating or measuring methods. Evaluation results are shown in Table 1.

Moreover, total evaluation was carried out based on these evaluation results. In the total evaluation, each sheet was evaluated as "○" in the case that all the evaluation results were good and as "X" in the case that there was a bad result in at lest one evaluation.

(Measuring Method of Pressure-sensitive Adhesive Force)

Each of the pressure-sensitive adhesive sheets obtained in Examples 1 to 4 and Comparative Examples 1 to 3 was cut into a strip having a width of 20 mm to prepare a pressure-sensitive adhesive product sample. The pressure-sensitive adhesive product sample was attached to a colorless ABS resin plate (acrylonitrile-butadiene-styrene-based resin plate) or SUS plate (stainless steel plate) as an adherend by reciprocating a roller of 2 kg once and allowed to stand under an atmosphere of 23° C. and 50% RH for 3 days. Thereafter, the pressure-sensitive adhesive product sample was peeled off by a tensile tester in an atmosphere of 23° C. and 50% RH at a peeling angle of 180° and a tensile rate of 300 mm/minute and a force required for the peeling at that time (pressure-sensitive adhesive force) was measured.

(Evaluating Method of Re-peeling Ability)

Each of the pressure-sensitive adhesive sheets obtained in Examples 1 to 4 and Comparative Examples 1 to 3 was cut into a size of 20 mm×30 mm to prepare a pressure-sensitive adhesive product sample. The pressure-sensitive adhesive product sample was attached to a colorless ABS resin plate (acrylonitrile-butadiene-styrene-based resin plate) or SUS plate (stainless steel plate) as an adherend by reciprocating a roller of 2 kg once, pressed thoroughly by hand, and allowed to stand under an atmosphere of 23° C. and 50% RH for 3 days. Thereafter, the pressure-sensitive adhesive product sample was peeled off in a manual fashion from the adherend and workability at that time was functionally evaluated according to the following evaluation standard.

Evaluation Standard
 ○: the sheet can be easily peeled off.
 X: the sheet cannot be easily peeled off owing to breakage of the substrate for the pressure-sensitive adhesive product or the like.

(Evaluating Method of Adhesive-residue Resistance)

After the evaluation of re-peeling ability by the above evaluating method of re-peeling ability, the surface of the adherend was visually observed and it was confirmed whether the pressure-sensitive adhesive components of the pressure-sensitive adhesive sheet remained on the surface of the adherend or not, whereby the adhesive-residue resistance was evaluated according to the following evaluation standard.

Evaluation Standard
 ○: no remaining pressure-sensitive adhesive component is observed (absence of so-called "adhesive residue").
 X: a remaining pressure-sensitive adhesive component is observed (presence of so-called "adhesive residue")

(Evaluating Method of Repulsion Resistance)

Each of the pressure-sensitive adhesive sheets obtained in Examples 1 to 4 and Comparative Examples 1 to 3 was a size of 10 mm×10 mm to prepare a pressure-sensitive adhesive product sample. The pressure-sensitive adhesive product sample was attached to the surface of an aluminum cylinder having an outer diameter of 10 mm by pressing thoroughly by hand and allowed to stand under an atmosphere of 23° C. and 50% RH for 1 day. Thereafter, an edge part of the pressure-sensitive adhesive product sample was observed visually by means of a loupe and it was confirmed whether lifting occurs at the edge part or not, whereby repulsion resistance was evaluated according to the following evaluation standard.

Evaluation Standard
 ○: no lifting occurs at the edge part.
 X: lifting occurs at the edge part.

TABLE 1

|  | Example | | | | Comparative Example | | |
|---|---|---|---|---|---|---|---|
|  | 1 | 2 | 3 | 4 | 1 | 2 | 3 |
| Pressure-sensitive adhesive force (N/20 mm) | | | | | | | |
| vs ABS plate | 3.2 | 2.4 | 2.6 | 3.4 | 7.6 | 1.2 | 4.0 |
| vs SUS plate | 4.8 | 4.4 | 4.4 | 5.0 | 8.0 | 1.4 | 6.4 |
| Re-peeling ability | | | | | | | |
| vs ABS plate | ○ | ○ | ○ | ○ | X | ○ | X |
| vs SUS plate | ○ | ○ | ○ | ○ | X | ○ | X |
| Adhesive-residue resistance | | | | | | | |
| vs ABS plate | ○ | ○ | ○ | ○ | X | ○ | X |
| vs SUS plate | ○ | ○ | ○ | ○ | X | ○ | X |
| Repulsion resistance | ○ | ○ | ○ | ○ | ○ | X | ○ |
| Overall judgment | ○ | ○ | ○ | ○ | X | X | X |

From Table 1, the pressure-sensitive adhesive products according to Examples 1 to 4 are good in re-peeling ability and adhesive-residue resistance and also repulsion resistance is good. Therefore, the pressure-sensitive adhesive product can be easily peeled off without leaving the pressure-sensitive adhesive components on the surface of the adherend in the case that the product is peeled off from the adherend when attached to the adherend by mistake or when the adherend should be repaired after the product has been attached to the adherend. Moreover, since repulsion resistance is also good, lifting of the edge part does not occur even when the product is attached to an adherend having a curved surface or the like surface shape and a good adhered state can be maintained for a long period of time.

Needless to say, since the substrate for the pressure-sensitive adhesive product is formed from the styrene-based resin composition, when attached to an adherend formed from a styrene-based resin or a polycarbonate-based resin, the product can be recycled together with the adherend, whereby the plastic materials can be easily reproduced.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive product comprising a substrate having formed on at least one surface thereof a pressure-sensitive adhesive layer, wherein the substrate is formed from a styrene-based resin composition and the pressure-sensitive adhesive layer is formed from an acrylic pressure-sensitive adhesive containing an acrylic polymer, a liquid paraffin, and a rosin-based tackifying resin, and
    wherein in the acrylic pressure-sensitive adhesive, the ratio of the liquid paraffin is 6 to 50 parts by weight based on 100 parts by weight of the acrylic polymer, and
    wherein the number-average molecular weight of the liquid paraffin is 300 to 500.

2. The pressure-sensitive adhesive product according to claim 1, wherein in the acrylic pressure-sensitive adhesive, the ratio of the rosin-based tackifying resin is 1 to 30 parts by weight based on 100 parts by weight of the acrylic polymer.

3. The pressure-sensitive adhesive product according to claim 1, wherein the dynamic viscosity of the liquid paraffin at 37.8° C. is 6 to 80 mm$^2$/second.

4. The pressure-sensitive adhesive product according to claim 1, wherein the rosin-based tackifying resin is a polymerized rosin.

5. The pressure-sensitive adhesive product according to claim 1, wherein the acrylic pressure-sensitive adhesive further contains a crosslinking agent.

6. The pressure-sensitive adhesive product according to claim 5, wherein the crosslinking agent is an isocyanate-based crosslinking agent.

7. The pressure-sensitive adhesive product according to claim 1, wherein the acrylic polymer is an acrylic polymer containing an alkyl acrylate having an alkyl group of 8 or more carbon atoms as a main monomer component.

8. The pressure-sensitive adhesive product according to claim 1, wherein the thickness of the pressure-sensitive adhesive layer is 5 to 50 μm.

9. The pressure-sensitive adhesive product according to claim 1, wherein a 180° peeling adhesive force (tensile rate: 300 mm/minute, 23° C., 50% RH) is 2 to 5 N/20 mm.

* * * * *